Figure 1:
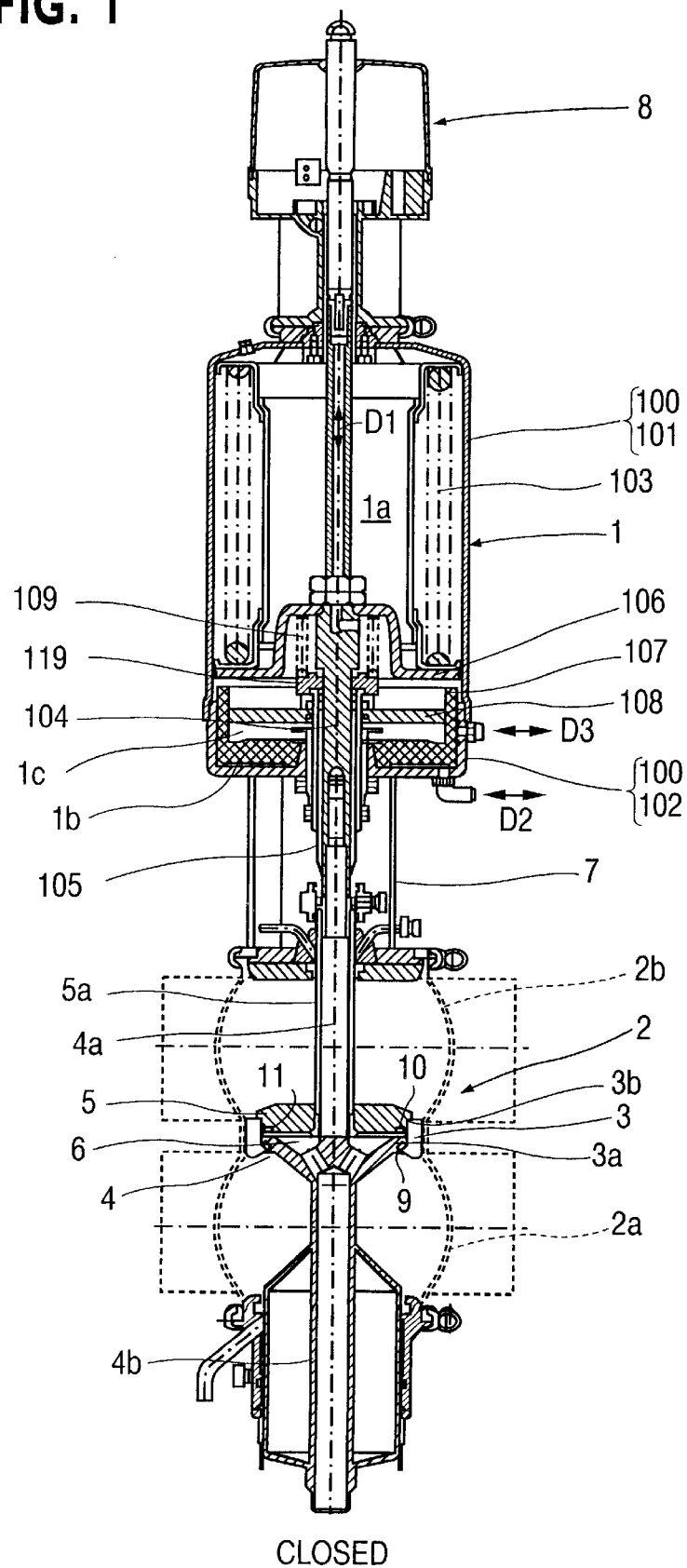

United States Patent
Coura et al.

[11] Patent Number: 6,047,730
[45] Date of Patent: Apr. 11, 2000

[54] DEVICE FOR THE DRIVE SYSTEM FOR DOUBLE SEAT VALVES

[75] Inventors: Herbert Robert Coura, Büchen; Jürgen Schreiber, Ratzeburg, both of Germany

[73] Assignee: Tuchenhagen GmbH, Büchen, Germany

[21] Appl. No.: 09/077,067

[22] PCT Filed: Nov. 15, 1996

[86] PCT No.: PCT/EP96/05031

§ 371 Date: May 18, 1998

§ 102(e) Date: May 18, 1998

[87] PCT Pub. No.: WO97/22821

PCT Pub. Date: Jun. 26, 1997

[30] Foreign Application Priority Data

Dec. 20, 1995 [DE] Germany .......................... 195 47 605

[51] Int. Cl.[7] ........................ F16K 31/222; F16K 31/143
[52] U.S. Cl. ................................. 137/614.18; 137/614.11; 137/613; 251/63.5; 251/63
[58] Field of Search .................... 137/614.18, 614.11, 137/613; 251/62, 63, 63.5

[56] References Cited

U.S. PATENT DOCUMENTS

| | | | |
|---|---|---|---|
| 4,304,251 | 12/1981 | Schadel et al. | 137/614.18 |
| 4,436,106 | 3/1984 | Tuchenhagene et al. | 137/614.11 |
| 4,483,360 | 11/1984 | Knappe et al. | 137/614.18 |
| 4,522,223 | 6/1985 | Balsys et al. | 137/614.18 |
| 4,552,167 | 11/1985 | Brakelmann | 137/614.18 |
| 4,605,035 | 8/1986 | Rasmussen et al. | 137/614.18 |
| 5,193,571 | 3/1993 | Levati | 137/614.11 |
| 5,575,305 | 11/1996 | Mieth | 137/614.18 |
| 5,699,825 | 12/1997 | Norton | 137/614.18 |

FOREIGN PATENT DOCUMENTS

| | | |
|---|---|---|
| 3005329A1 | 8/1981 | Germany . |
| 3108973A1 | 10/1982 | Germany . |
| 3133273A1 | 3/1983 | Germany . |
| 4236464C2 | 8/1995 | Germany . |

*Primary Examiner*—Denise L. Ferensic
*Assistant Examiner*—Joanne Y. Kim
*Attorney, Agent, or Firm*—Lane, Aitken & McCann, L.L.P.

[57] ABSTRACT

The invention relates to a device for the drive system for double seat valves comprising two individually movable closure members which, in addition to the open position, can each be individually moved into a partial open position. The object of the invention is to construct a device which is easy to assemble and is space-saving and which should be able to provide externally adjustable, partial lift stops for both closure members. Said object is attained in that a piston (107) of a first individual adjustment device (1b) for the partial open position (T1) of the independently driven closure member (4) is displaceably arranged, to form a seal, externally in a drive housing (100) of the drive device (1), and a piston (108) of a second individual adjustment device (1c) for the partial open position (T2) of the dependently driven closure member (5) is displaceably arranged, to form a seal, externally in a cylindrical recess (107a) of the piston (107), which recess faces a main adjustment device (1a).

6 Claims, 5 Drawing Sheets

CLOSED

CLOSED

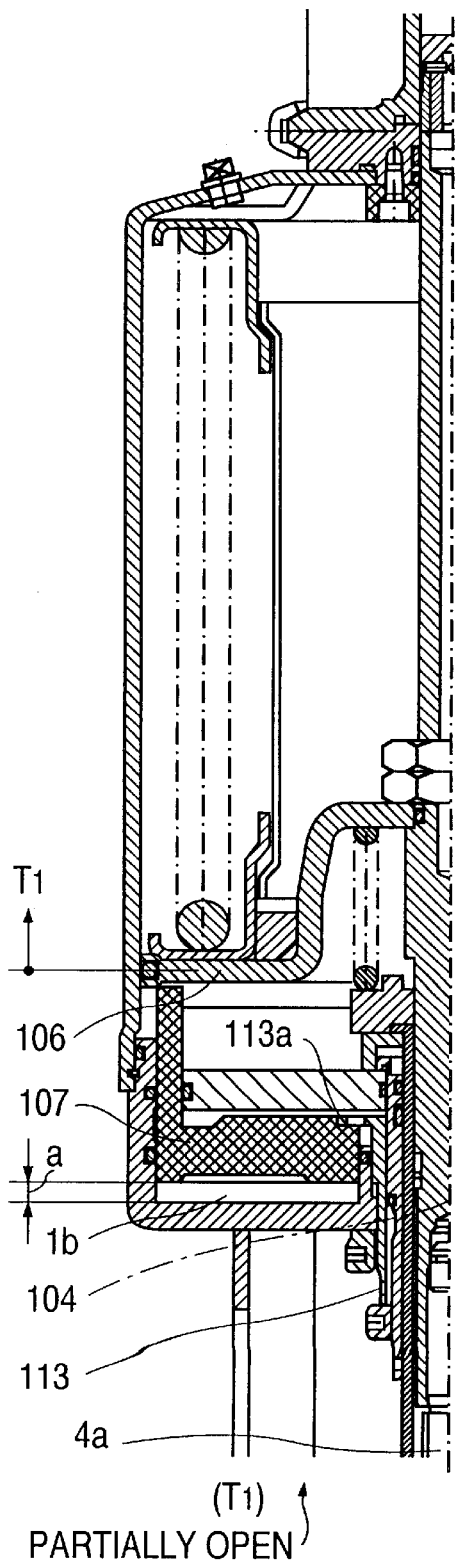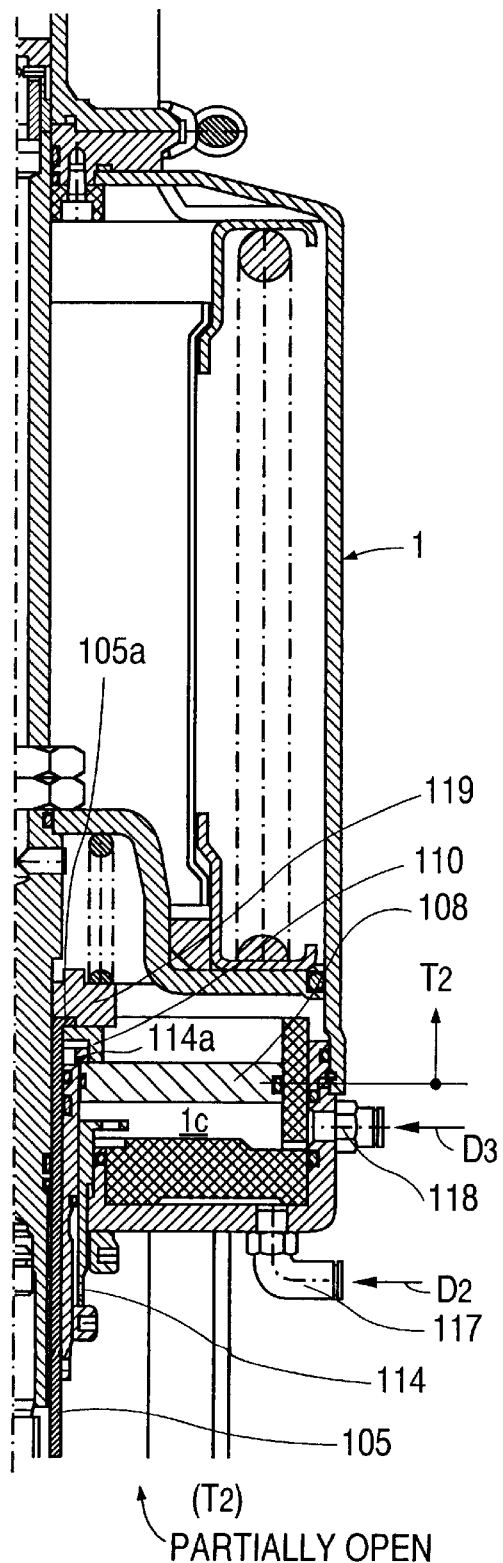

ALT. EMBOD.

DEVICE FOR THE DRIVE SYSTEM FOR DOUBLE SEAT VALVES

The invention relates to an actuating device for double seat valves with two individually movable closure members.

A generic actuating device for double seat valves is known from the company publication UNIVENT Doppeldicht-Ventil TYP 916 [UNIVENT Type 916 double sealed valve], GEA AHLBORN, Sarstedt. This solution is a space saving actuating device in which the main adjustment mechanism and individual adjustment mechanisms are combined in a common drive housing; because of the proposed piston arrangements, however, the state-of-the-art solution does not at all provide the possibility of externally adjustable partial stroke limitations for both closure members when such are required.

The state of the art in question was developed to the effect that there is provided between the drive housing and valve housing a so-called lantern (spacer) which makes it possible, with the piston arrangement otherwise unchanged, to provide at least one partial stroke limitation for the dependently actuated closure member in the main adjustment mechanism and an individual adjustment mechanism. Since the piston of the individual adjustment mechanism for the individually actuated closure member is provided between the main adjustment mechanism and the individual adjustment mechanism for the dependently actuated closure member, there is no possibility of providing externally adjustable partial stroke limitation for the piston. This last-named state of the art is documented by company data of the Cherry-Byrell Corporation, Cedar Rapids, Iowa, U.S.A.

In order to create the possibility of providing externally adjustable partial stroke limitations for both closure members, it has been proposed that the adjusting rod of the individually actuated closure member be extended to the outside through the main adjustment mechanism and that the individual adjustment mechanism required be mounted there, on a side of the actuating mechanism facing away from the valve housing of the double seat valve (DE 30 05 329 C2). Not only does an actuating device such as this differ fundamentally from the generic device, it also saves less space and in particular is more costly to install.

In a control mechanism for double seat valves disclosed in DE 31 08 973 C2, both adjusting rods extend upward through the main adjustment mechanism and are connected externally with each associated individual adjustment mechanism. Although this state-of-the-art actuating device does provide the possibility of making adjustable partial stroke limitations externally and from one side, the design as a whole is very costly and the dimensions excessive, in that the individual adjustment mechanisms are not integrated into the housing of the main adjustment mechanism but are rather added to this housing by way of an inserted spacer housing. In addition, a distinctly higher installation cost is required than with integrated actuation solutions.

A cleanable double seat valve with leakage control is known from DE 31 33 273 A1; in it both valve heads may be transferred to partly open positions individually and independently of each other. For this purpose the double seat valve has, below a main adjustment mechanism producing the full stroke, an additional adjustment mechanism having in a single housing cylinder compartments separated by pistons which are limited and individually controllable. This overall actuating device is also of a design which takes up much space, in that the individual adjustment mechanisms are not integrated into the housing of the main adjustment mechanism but are provided as added components between the main adjustment mechanism and a spacer housing connected to the valve housing. Adjustable partial stroke limitations are not provided. They are theoretically possible, but on smaller valve heads, only by extending the valve rod connected to a valve head through the main adjustment mechanism and providing adjustable partial stroke limitation above the latter.

The object of this invention is to develop a generic device by an installation friendly and space saving process, and also to meet the requirement of providing externally adjustable partial stroke limitations for both closure members.

The device proposed is space saving, in that it has a main adjustment mechanism and individual adjustment mechanisms associated with pertinent closure members in a common drive housing. The proposed piston arrangement of the individual adjustment mechanisms also now makes it possible to create in the simplest manner conceivable access to the pistons of the individual adjustment mechanisms, by way of a spacer housing connecting the drive housing to the valve housing, and accordingly to provide when necessary the possibility of externally adjustable partial stroke limitations for both closure members. In a preferred embodiment of the device proposed this is accomplished by means of variability of the stop position of the piston which is provided for partial stroke limitation of the closure members relative to the pertinent adjusting rod on the latter from the exterior of the actuating mechanism in the area of a spacer housing connecting the latter to the valve housing. Another advantageous embodiment provides in this context that the pertinent stop position of the piston is determined by stop sleeves interpenetrating in the axial direction, sleeves through which extend the adjusting rods, which are positioned concentrically relative to each other, the exterior stop sleeve in the drive housing and the interior stop sleeve in the exterior housing each being mounted so as to be adjustable and stationary.

The device proposed is particularly installation friendly if the drive housing is divided into a first and a second housing component, the former receiving the primary adjusting mechanism and the latter the individual adjustment mechanisms. This makes it possible to premount first the main adjustment mechanism in the first housing component and the two individual adjustment mechanisms in the second housing component and merely join the two housing components in order to control the force to be generated by way of a second spring in the drive housing, which force acts between the two closure members and is simple to contain.

The device proposed offers the additional advantage that simple modification of a few secondary components results in an actuating device suitable for actuation of double seat valves with two individually movable closure members, the independently actuated one being designed as a valve piston with radial sealing means and the dependently actuated one as a seating plate. This closure member configuration requires first a partly open position T1 for the independently actuated closure member designed as a slide valve, this position facing in the direction of the opening stroke H of the double seat valve, and secondly a partly open position T2 of the dependently actuated closure member designed as a seating plate, this position oriented in the direction of opening stroke H. A brief explanation is given below of alternative actuation in this context (see the description in conjunction with FIG. 6).

One exemplary embodiment of the device proposed as claimed for the invention is shown in the accompanying drawing and is described in what follows.

In the drawing

Figure 2:
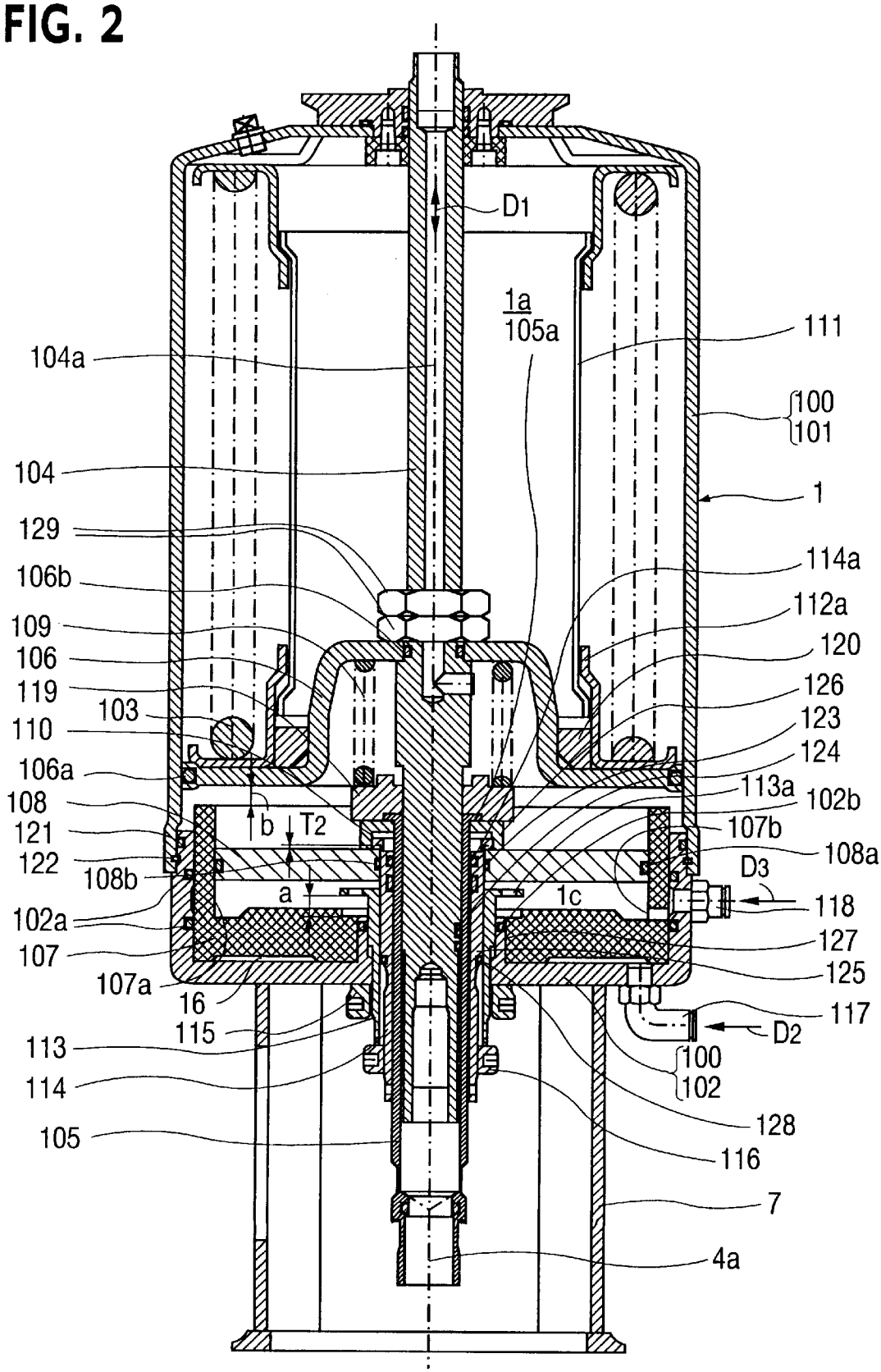
Figure 3:
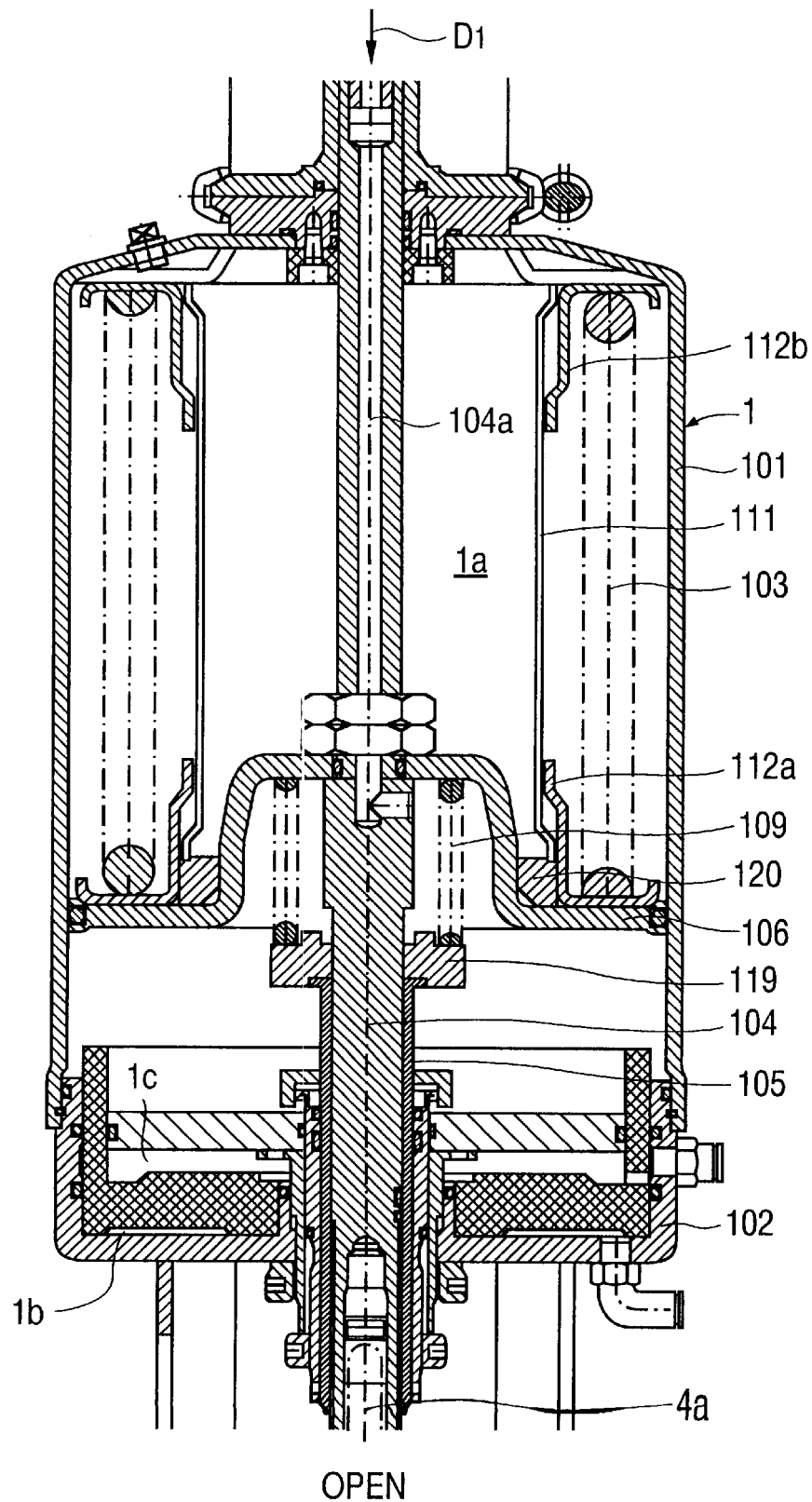

FIG. 1 shows a cross-section through a double seat valve with a device as claimed for the invention, in a preferred embodiment, the double seat valve being shown in the closed position;

FIG. 2 a detailed representation of the device as shown in FIG. 1, in a cutaway section and on a larger scale;

FIG. 3 the device as shown in FIG. 1, in isolation, in the open position corresponding to the open position of the double seat valve;

FIG. 4 the device as shown in FIG. 3, in a position corresponding to that in which the independently actuated closure member has been shifted to partly open position T1; and FIG. 5 the device proposed as shown in FIG. 3, with the double seat valve in a position in which the independently actuated closure member is in partly open position T2.

Figure 6:
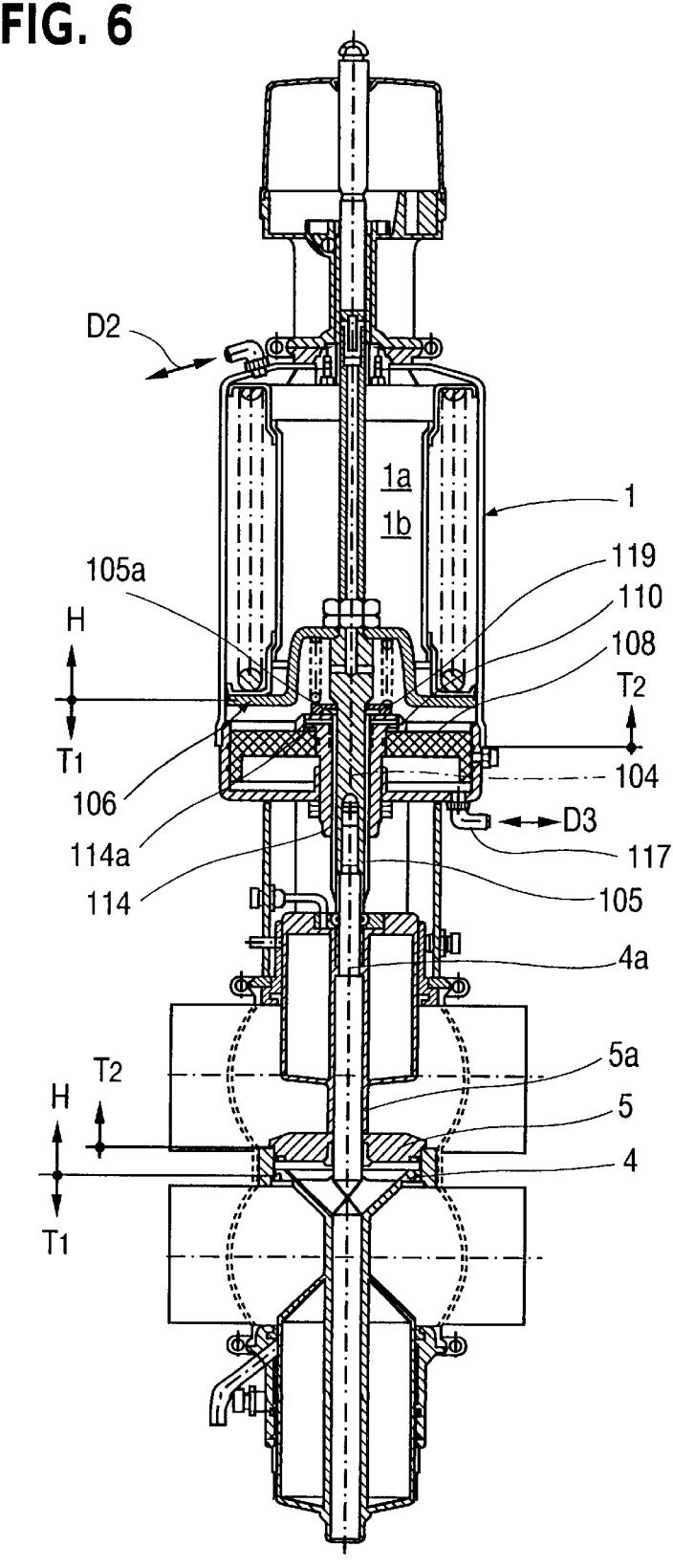

FIG. 6 illustrates the proposed device in a modified embodiment suitable for actuation of a double seat valve, an embodiment in which the independently actuated closure member is designed as a slide valve and the dependently actuated member as a seating plate.

An actuating device 1 (FIG. 1) is used for actuation of a double seat valve which consists essentially of a valve housing 2 with a first and a second valve housing component 2a and 2b, two individually movable closure members 4 and 5 with adjusting rods 4a and 5a associated with the latter, a spacer housing 7 connecting the valve housing 2 to the actuating device 1, and an answer back signal housing 8 for monitoring individual positions of the double seat valve. The two closure members 4 and 5 designed as seating plates 4 and 5 with associated seating seal 9 or 10 form between them, with the double seat valve in both the closed and the open positions, a leakage cavity 6 which acts as a seal from the surroundings when the double seat valve is in the open position and is connected to the surroundings of the double seat valve by a discharge pipe 4b extending through the first valve housing component 2a mounted on the independently actuated closure member 4. A first seating surface 3a is formed on a seating ring 3 for the first closure member 4 and a second seating surface 3b for the second closure member 5.

One function assigned to the actuating device is that of transferring the double seat valve from its closed position to its open position and then back to its closed position. For this purpose a main adjustment mechanism 1a is provided in a common drive housing 100, which may consist, for example, of a first and a second housing component 101 or 102; this adjustment mechanism is of state-of-the-art design consisting essentially of a main piston 106 loaded by a main spring 103 and of a first pressure medium supply D1. The main piston 106 is rigidly connected either directly or, as in the embodiment shown, indirectly by way of a valve rod 104, to the internal adjusting rod 4a. The external adjusting rod 5a of the second closure member 5, which is in the form of a hollow rod, extends directly or, as is shown in the exemplary embodiment, indirectly by way of a hollow rod 105, into the actuating device 1 and there has a spring support 119 for a second spring 109 supported by the main piston 106 on the other side. In the position shown, with the double seat valve closed, the initially tensioned main spring 103 presses the first closure member 4 against its first seating surface 3a, while the second spring 109 presses the second closure member 5 against the second seating surface 3b.

There are also provided in the actuating device 1, in the second housing component 102, two individual adjustment mechanisms 1b and 1c, the latter with its piston 108 being associated with the hollow rod 105 or the external adjusting rod 5a and accordingly with the dependently actuated closure member 5. The piston 108 has pressure applied to it from below by pressure medium and is actuated by way of a third pressure medium supply D3. The individual adjustment mechanism 1b has a piston 107 which is associated with the independently actuated first closure member 4 by way of the adjusting rod 104 and accordingly internal adjusting rod 4a. Pressure medium loading of the piston 107, also from below, is accomplished by way of a second pressure medium supply D2.

FIG. 3 illustrates the double seat valve in the open position, which is brought about by pressure medium loading of the main adjustment mechanism 1a. Pressure medium D1 is for this purpose delivered to the bottom of the main piston 106 through a hole 104a in the valve rod 104. The main piston 106 moves upward against the force of the main spring 103 until it comes to rest against the head component (not shown) of the first housing component 101, by way of a spacer ring 120 and intermediate cage component 111. The main spring 103 is in a cage made up of the intermediate cage component 111 and two end cage components 112a and 112b mounted adjacent so as to be movable relative to the latter. Details of the proposed actuating device 1 are shown in FIG. 2, in particular details of the individual adjustment mechanisms 1b and 1c.

The piston 107 (FIG. 2) is cupshaped and is sealed externally so as to be movable in the second housing component 102 by way of two axially spaced outer piston seals 102a and internally, still in the second housing component 102, in a central component, by way of an inner piston seal 102b. On its side facing the main adjustment mechanism the piston 107 is provided with a cylindrical recess 107a in which the piston 108 is mounted so as to be movable and sealed by an external piston seal 108a. Internally the piston 108, sealed by an inner piston seal 108b, slides on an internal stop sleeve 114, through which in turn the hollow rod 105 extends concentrically.

Pressure is applied to the piston 107 by the pressure medium D2 from below over a first pressure medium connection 117 and to piston 108 by the pressure medium D3, also from below, over a second pressure medium connection 118 and an opening 107b extending through the piston 107 in the bottom of the cylindrical recess 107a. The pressure medium D1 loading the main piston 106 is delivered by way the hole 104a in the valve rod 104. The pressure loaded space below the main piston 106 is sealed against the surroundings by a first piston seal 106a effecting sealing from the internal jacket surface of the first housing component 101, a second piston seal 106b mounted between the main piston 106 and the valve rod 104, below two lock nuts 129, a housing seal 121 sealing the housing components 101 and 102 off from each other, a rod seal 125 mounted between the valve rod 104 and the hollow rod 105, a hollow rod seal 126 provided between the hollow rod 105 and the inner stop sleeve 114, and two other seals 127 and 128. The seal 127 seals an external stop sleeve 113 concentrically enclosing the internal stop sleeve 114 externally from the second housing component 102, while the seal 128 seals the external stop sleeve 113 internally from the internal stop sleeve 114. The numbers 123 and 124 identify a first and a second guide ring which ensures perfect displacement of the hollow rod 105 inside the internal stop sleeve 114 and perfect displacement of the valve rod 104 in the hollow rod 105.

The external stop sleeve 113 is mounted in the second housing component 102 so as to be adjustable by way of threading and so as to be locked in position against this housing component by a first lock nut 115. The internal stop sleeve 114 may be similarly adjusted and locked in position in the external stop sleeve 113 by means of a second lock nut 116.

The external stop sleeve 113 also has a first recess 113*a* performing the function of limiting the partial stroke of the piston 107. If the latter is displaced upward by a stroke distance identified as a, to come to rest against the first recess 113, the piston 107, after completing a partial stroke movement identified as b, comes to rest against the main piston 106 and displaces the latter a partial stroke distance T1=a–b, so that the valve rod 104 connected to the main piston 106 transfers the associated individually actuated closure member 4 to the corresponding partly open position T1 (compare the associated end position of the piston 107 in FIG. 4). The closure member 4 is as a result moved from its associated first seating surface 3*a* and so-called seating surface cleansing from the first valve housing component 2*a* into the leakage cavity 6 by way of the now cleared first seating surface 3*a* becomes possible. The cleansing medium gathered in this manner from the first valve housing component 2*a* drains from the leakage cavity 6 into the surroundings of the double seat valve by way of discharge pipe 4*b* (see also FIG. 1).

If pressure is applied to the bottom of the piston 108 by pressure medium D3, this piston moves upward and ultimately comes to rest against a second recess 114*a* at the top of the internal stop sleeve 114. When the piston 108 completes its partial stroke movement it displaces a spacer 110 located in this direction of movement in a positive locking carrier connection with a hollow rod head 105*a* of the hollow rod 105 in the form of a recess. As a result, the hollow rod 105 and accordingly the external adjusting rod 5*a* of the dependently actuated closure member 5 are also displaced upward, so that the corresponding partly open position T2 of the closure member 5 is obtained on the second seating surface 3*b*. The pertinent end position of the actuating device 1 is to be seen from FIG. 5. In this position cleansing medium can now flow from the second valve housing component 2*b* into the leakage cavity 6 by way of the cleared second seating surfaces 3*b* and from this point reach the surroundings of the double seat valve over the discharge pipe 4*b* (see FIG. 1).

Installation of the proposed actuating device 1 is the simplest such process conceivable (see FIG. 2). Since the valve rod 104 and the hollow rod 105 may be separated from the associated internal adjusting rod 4*a* and accordingly the external adjusting rod 5*a*, complete installation of the actuating device 1 can be accomplished with these rods detached from the double seat valve. First the main adjusting mechanism la may be premounted in the first housing component 101. The same applies to the individual adjusting mechanisms 1*b* and 1*c* inside the second housing component 102. The two housing components 101 and 102 may then be joined and connected to each other by way of a securing ring 122. Partial stroke movement of the closure members 4, 5, is limited if the actuating device 1 is connected to the double seat valve and if the necessary partly open positions T1 and T2 in the seating area may be assigned in advance and determined on the basis of interaction of all decisive components and their tolerances and may be determined by adjustment of the external and internal stop sleeves 113 and 114. The stop sleeves 113, 114, may each be adjusted with high precision by way of fine screw threading in the components receiving the sleeves and reliably secured by way of the lock nuts 115 and 116.

FIG. 6 illustrates how, as a result of simple modification of the proposed actuating device 1 a double seat valve may be actuated whose independently actuated closure member is in the form of a slide valve with radial sealing means and whose dependently actuated closure member is in the form of a seating plate. In this closure member configuration the partly open position T1 of the closure member 4 is reached in the direction opposite that of the opening stroke H. In order to achieve the partly open position T1, pressure medium D2 applies pressure to the main piston 106 from above by way of a pressure medium connection not shown. Limitation of the partial stroke of the closure member 4 downward is accomplished as a result of the circumstance that the valve rod 104 comes to rest against a recess (not shown) above the spring support 119. The partly open position T2 of the dependently actuated closure member 5 is effected by the piston 108, to which pressure is applied by pressure medium D3 by way of the first pressure medium connection 117. Entrainment of the hollow rod 105 by its hollow rod head 105*a* and limitation of the partial stroke of the piston 108 by a second recess 114*a* in the stop sleeve 114 have already been discussed in the foregoing.

What is claimed is:

1. An actuating device for double seat valves with two individually movable closure members (4, 5), including an independently actuated closure member (4) and a dependently actuated closure member (5), the independently actuated closure member coming to rest against the dependently actuated closure member (5) after a partial stroke and, as the independently actuated closure member opens, the independently actuated closure member transfers the dependently actuated closure member (5) to an open position, and the two individually movable closure members (4, 5), in addition to an open position, are each transferable independently of each other to a partly open position, the actuating device having a main adjusting mechanism (1*a*) and first and second individual adjustment mechanisms (1*b*, 1*c*) associated with the closure members (4, 5), the main adjusting mechanism and the first and second individual adjustment mechanisms all being in a common drive housing, the individual adjustment mechanisms (1*b*, 1*c*) being mounted between the main adjustment mechanism (1*a*) and the valve housing (2) and engaging adjusting rods for the closure members (4, 5), a respective piston (107, 108) being mounted on an associated one of the adjusting rods, each piston being axially movable in one direction on the associated adjusting rod and, in an opposite direction, being transferable to engagement with an entrainment connection with the associated adjusting rod, wherein the piston (107) of the first individual adjustment mechanism (1*b*) for the partly open position (T1) of the independently actuated closure member (4) is movably mounted so as to be sealed externally in the drive housing (100) of the actuating device (1), the piston (108) of the second individual adjustment mechanism (1*c*) for the partly open position (T2) of the dependently actuated closure member (5) is in turn mounted movably so as to be sealed externally in a cylindrical recess (107*a*) in the piston (107) of the first individual adjustment mechanism (1*b*), the cylindrical recess facing the main adjustment mechanism (1*a*).

2. A device as described in claim 1, wherein the stop position of the pistons (107, 108) provided for limitation of the partial stroke of the closure members (4, 5) in relation to the pertinent adjusting rod (4*a* or 104, 5*a* or 105) on the latter can be varied from outside the actuating device (1) in the area of a spacer housing (7) connecting the latter to the valve housing (2).

3. A device as claimed in claim 2, wherein the stop position of each of the pistons (107, 108) is determined by means of stop sleeves (113, 114) which interpenetrate in the axial direction and through which extend the concentrically mounted adjusting rods (4*a* and 104, 5*a* and 105), the external stop sleeve (113) being mounted in the drive housing (100) and the internal stop sleeve (114) in the external stop sleeve (113) so as to be respectively adjustable and stationary.

4. A device as claimed in claim 1, wherein the drive housing (100) is divided into a first and a second housing component (101 and 102), the first (101) receiving the main adjustment mechanism (1*a*) and the second (102) the individual adjustment mechanisms (1*b*, 1*c*).

5. An actuating device for double seat valves with two individually movable closure members (4, 5), including an independently actuated closure member (4) and a dependently actuated closure member (5), the independently actuated closure member coming to rest against the dependently actuated closure member (5) after a partial stroke and, as the independently actuated closure member opens, the independently actuated closure member transferring the dependently actuated closure member (5) to an open position, the two individually movable closure members (4, 5), in addition to the open position, being each transferable independently of each other to a partly open position, the actuating device having a main adjusting mechanism (1*a*) and first and second individual adjustment mechanisms (1*b*, 1*c*) associated with the closure members (4, 5), the main adjusting mechanism and the first and second individual adjustment mechanisms all being in a common drive housing, the individual adjustment mechanisms (1*b*, 1*c*) being mounted between the main adjustment mechanism (1*a*) and the valve housing and engaging adjusting rods of the closure members (4, 5) by way of pistons of the individual adjustment mechanisms, the pistons being mounted on the adjusting rods so as to be movable in one direction and so as to be transferable to engagement with an entrainment connection, wherein the piston (107) of the first individual adjustment mechanism (1*b*) for the partly open position (T1) of the independently actuated closure member (4) is movably mounted so as to be sealed externally in the drive housing (100) of the actuating device (1), the piston of the second individual adjustment mechanism (1*c*) for the partly open position (T2) of the dependently actuated closure member (5) is in turn mounted movably so as to be sealed externally in a cylindrical recess (107*a*) of the piston facing the main adjustment mechanism (1*a*), each of the pistons (107, 108) has a stop position, provided for limitation of the partial stroke of the closure members (4, 5) in relation to the pertinent adjusting rod (4*a* or 104, 5*a* or 105) on the latter, that can be varied from outside the actuating device (1) in the area of a spacer housing (7) connecting the latter to the valve housing (2), and the stop position of each of the pistons (107, 108) is determined by means of stop sleeves (113, 114) which interpenetrate in the axial direction and through which extend the concentrically mounted adjusting rods (4*a* and 104, 5*a* and 105), the external stop sleeve (113) being mounted in the drive housing (100) and the internal stop sleeve (114) in the external stop sleeve (113) so as to be respectively adjustable and stationary.

6. An actuating device for double seat valves with two individually movable closure members (4, 5) including an independently actuated closure member (4) and a dependently actuated closure member (5), the independently actuated closure member coming to rest against the dependently actuated closure member (5) after a partial stroke and, as the independently actuated closure member opens, the independently actuated closure member transferring the dependently actuated closure member (5) to an open position, the two individually movable closure members (4, 5), in addition to the open position, being each transferable independently of each other to a partly open position, the actuating device having a main adjusting mechanism 1(*a*) and first and second individual adjustment mechanisms (1*b*, 1*c*) associated with the closure members (4, 5), the main adjusting mechanism and the first and second individual adjustment mechanisms all being in a common drive housing, the individual adjustment mechanisms (1*b*, 1*c*) being mounted between the main adjustment mechanism (1*a*) and the valve housing (2) and engaging adjusting rods of the closure members (4, 5) by way of pistons of the individual adjustment mechanisms, the pistons being mounted on the adjusting rods so as to be movable in one direction and so as to be transferable to engagement with an entrainment connection, wherein the piston (107) of the first individual adjustment mechanism (1*b*) for the partly open position (T1) of the independently actuated closure member (4) is movably mounted so as to be sealed externally in the drive housing (100) of the actuating device (1), the piston (108) of the second individual adjustment mechanism (1*c*) for the partly open position (T2) of the dependently actuated closure member (5) is in turn mounted movably so as to be sealed externally in a cylindrical recess (107*a*) of the piston facing the main adjustment mechanism (1*a*), and the drive housing (100) is divided into a first and a second housing component (101 and 102), the first (101) receiving the main adjustment mechanism (1*a*) and the second (102) the individual adjustment mechanisms (1*b*, 1*c*).

* * * * *